United States Patent
Brrang

(10) Patent No.: US 9,581,488 B2
(45) Date of Patent: Feb. 28, 2017

(54) WEIGHING APPARATUS WITH SECURED COMMUNICATION MEANS

(75) Inventor: Balraj Singh Brrang, Wolverhampton (GB)

(73) Assignee: ILLINOIS TOOL WORKS INC., Glenview, IL (US)

( * ) Notice: Subject to any disclaimer, the term of this patent is extended or adjusted under 35 U.S.C. 154(b) by 728 days.

(21) Appl. No.: 13/378,307

(22) PCT Filed: Jun. 9, 2010

(86) PCT No.: PCT/US2010/037873
§ 371 (c)(1),
(2), (4) Date: Dec. 14, 2011

(87) PCT Pub. No.: WO2010/147810
PCT Pub. Date: Dec. 23, 2010

(65) Prior Publication Data
US 2012/0095727 A1    Apr. 19, 2012

(30) Foreign Application Priority Data
Jun. 15, 2009 (GB) .................... 0910257.5

(51) Int. Cl.
G01G 23/01 (2006.01)
(52) U.S. Cl.
CPC .......... G01G 23/015 (2013.01); G01G 23/017 (2013.01)
(58) Field of Classification Search
CPC ..................... G01G 23/017; G01G 23/015
USPC ................... 702/173, 101, 104, 105
See application file for complete search history.

(56) References Cited

U.S. PATENT DOCUMENTS

| | | | |
|---|---|---|---|
| 6,810,355 B1* | 10/2004 | Kreidler et al. | 702/173 |
| 7,298,369 B2* | 11/2007 | Amtmann et al. | 345/418 |
| 7,361,851 B2* | 4/2008 | Brighenti | 177/25.13 |
| 2003/0233633 A1* | 12/2003 | Steinrisser et al. | 717/109 |
| 2004/0050593 A1* | 3/2004 | Baeumel | G01G 23/017 177/25.13 |
| 2004/0068341 A1* | 4/2004 | Minucciani et al. | 700/110 |
| 2005/0038565 A1* | 2/2005 | Power | G06Q 10/06 700/266 |
| 2006/0052981 A1* | 3/2006 | Klein | 702/173 |
| 2006/0064264 A1* | 3/2006 | Pottebaum et al. | 702/101 |

(Continued)

FOREIGN PATENT DOCUMENTS

| | | | |
|---|---|---|---|
| DE | 102006050638 A1 | 5/2008 | |
| JP | 02002214032 A * | 7/2002 | G01G 23/01 |

(Continued)

OTHER PUBLICATIONS

Search Report for GB Application No. 0910257.5 dated Feb. 25, 2010.
ISR for PCT/US2010/037873 dated Sep. 20, 2010.

*Primary Examiner* — Alexander Satanovsky
(74) *Attorney, Agent, or Firm* — Hauptman Ham, LLP

(57) ABSTRACT

A weighing apparatus 1 comprising a load cell 4, a processing unit 3 external of the load cell 4 and data means 7, 8, 9, 10 for operating the weighing apparatus wherein a portion of the data means 7, 9, 10 is distributed between the processing unit 3 and the load cell 4 with secured communication means 6 operative between the load cell 4 and the processing unit 3. Preferably the data means 7, 9, 10 distributed between the processing unit 3 and the load cell 4 is subject to legal control or legally relevant software.

33 Claims, 1 Drawing Sheet

(56) References Cited

U.S. PATENT DOCUMENTS

2007/0220506 A1* 9/2007 Maruyama .................... 717/168
2008/0103716 A1* 5/2008 Churan .................. G01G 21/26
                                                         702/101

FOREIGN PATENT DOCUMENTS

| WO | 0051284 A1 | 8/2000 |
| WO | 2004049083 A2 | 6/2004 |

* cited by examiner

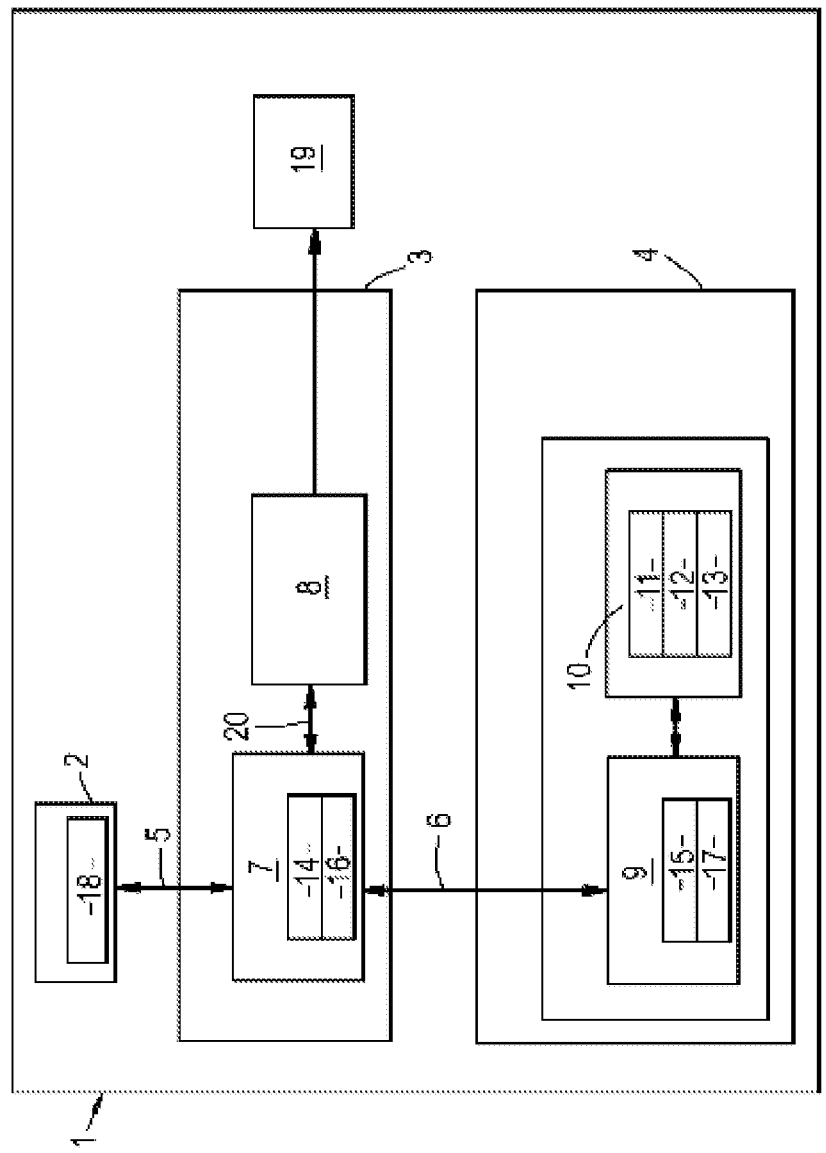

WEIGHING APPARATUS WITH SECURED COMMUNICATION MEANS

RELATED APPLICATIONS

The present application is national phase of PCT/US2010/037873 filed Jun. 9, 2010, and claims priority from United Kingdom Application Number 0910257.5 filed Jun. 15, 2009.

FIELD OF INVENTION

The present invention relates to a data protection system for a weighing scale, more particularly to a weighing apparatus to prevent tampering or inadvertent modification of data that are subject to legal control according to The International Organisation of Legal Metrology (International Recommendation OIML R76-1:2006(E)) and/or International Document OIML D31:2008(E).

INTRODUCTION

Traditionally, weighing scales are sealed with a paper or metallic seal such as lead to prevent unauthorised access to areas of the weighing scale that are critical for weight measurement and calculation, such as configuration data, calibration data, span adjustment, zero adjustment and other metrologically important parameters etc. Typically, the bulk of the processing of the software and storage of data essential for the operation of the weighing instrument are carried out by a personal computer which is suitably interfaced to the hardware components of the weighing instrument such as the load cell. However, until recently no restrictions have been applied to the updating and modification of the software pertinent for processing of weighing related information.

The International Organisation of Legal Metrology (OIML), an intergovernmental organization set up to govern the regulations and metrological characteristics applied by national metrological services of its Member States, have now set out in OIML R76-1:2006(E) more stringent safeguards to prevent fraudulent trading or accidental misappropriation of data. One of the criteria set out in OIML R76-1:2006(E) is that programs, data, type-specific and device-specific parameters that are critical for measurement characteristics, measurement data and metrologically important parameters stored or transmitted and which are considered an essential part of a weighing instrument are subject to legal control and defined as the "legally relevant software". Examples of type-specific parameters include parameters used for mass calculation, stability analysis or price calculation and rounding, software identification etc. Device-specific parameters include calibration parameters such as span adjustment or other adjustments or corrections and configuration calibration parameters such as maximum capacity, minimum capacity, units of measurement, tare values etc. Alteration or modification of such data will affect the calculation of the weight reading and any price associated with the weight thereby opening the possibility of fraudulent activity. According to the recommendations set out in OIML R76-1:2006(E) there should be unambiguous separation of software into the legally relevant software and the non-legally relevant software and that the legally relevant software should meet the following requirements:— a) The legally relevant software should be adequately protected against accidental or intentional changes. Evidence of an intervention such as changing, uploading or circumventing the legally relevant software should be available from the next verification or comparable official inspection. The legally relevant software with all data, parameters, variable values etc. will be regarded as sufficiently protected, if it cannot be changed with common software tools.
 b) Associated software which provides other functions besides the measuring function(s).
 c) The legally relevant software should be identifiable and should not be inadmissibly influenced by the associated software, i.e. the associated software is separated from the legally relevant software in the sense that they communicate via a software interface whereby only a defined and allowed set of parameters, functions and data can be exchanged via this interface.
 d) Legally relevant software should be identified as such and should be secured. Its identification should be easily provided by the device for metrological inspections.

A method of preventing inadvertent tampering with the legally relevant software data and fraudulent activity thereby, providing conformity with the regulations as set out in OIML R76-1:2006(E) and which is currently used in practice is the use of a 'checksum algorithm', whereby a checksum is calculated from the legally relevant software and compared with a corresponding stored checksum. If the checksums do not match, the software data is considered to have been altered.

Despite the use of a checksum to prevent inadvertent tampering with the legally relevant software, there is still the opportunity for fraudulent activity as the complete software is still accessible to persons without having any certification or authority recognised by the International Organisation of Legal Metrology. Moreover, the increasing ability and expertise in software hacking would mean that the software is vulnerable to being hacked resulting in modification of essential parameters of the weighing instrument such as price, tare values etc. Moreover, knowing the value of the stored checksum a checksum algorithm can be modified to yield the same checksum result. This would not only present an incorrect weight as the correct weight but allow the seller to gain fraudulently from any price gain associated with the weight.

A secure system for a weighing instrument is thus required to prevent inadvertent tampering of the legally relevant software, and which is more secure than tamper indication means currently on the market such as the use of a checksum algorithm, and yet which is in conformity with the recommendation set out in OIML R76-1:2006(E).

SUMMARY OF THE INVENTION

The present applicant has mitigated the above problem by providing a weighing apparatus comprising:—
 a) a load cell
 b) a processing unit external to the load cell;
 c) data means for operating the weighing apparatus;
characterised in that a portion of the data means is distributed between the processing unit and the load cell with secured communication means operative between the load cell and the processing unit. Preferably, the data means comprises legally relevant software and non-legally relevant software. More preferably, the portion of the data means that is distributed between the processing unit and the load cell is the legally relevant software. As discussed above, legally relevant software represents programs, data, type-specific and device-specific parameters that are critical for measurement characteristics, measurement data and metrologically important parameters stored or transmitted and which are considered an essential part of a weighing instrument such as to be subject to legal control as set out in OIML R76-1:2006(E).

The present applicant has realised that by distributing or sharing a portion of the data means, more particularly the legally relevant software, between the processing unit and the load cell with secured communication means operative between the processing unit and the load cell, additional security is provided to prevent unauthorised access and alteration of or tampering with the data means or the legally relevant software. Even if the user did attempt to tamper with the legally relevant software, for example by replacing the software that is accessible in the processing unit with another application, the secured communication operative between the weigh cell and the processing unit would prevent normal operation of the weighing instrument as the portion of the legally relevant software distributed in the processing unit would be unable to communicate with the portion of the legally relevant software distributed in the load cell. Thus, it is essential that there is two-way communication between the portion of the legally relevant software in the processing unit with the portion of the legally relevant software in the load cell.

More preferably, the load cell has interface means so that a portion of the data means in the load cell interfaces with both the load cell and the portion of the data means in the processing unit to provide one or more of the following:— a. acceptance of data updates from the processing unit;
 b. acceptance of calibration data,
 c. acceptance of capacity configuration data;
 d. acceptance of audit log entries from the processing unit;
 e. acceptance of gravity factor data;
 f. weight readings to be provided to the processing unit;
 g. configuration data to be provided to the processing unit;
 h. audit log entries to be provided to the processing unit.

Any attempt to replace or modify parts of the legally relevant software distributed in either the processing unit or the load cell would prevent normal operation of the weighing apparatus. Preferably, the weighing apparatus comprises a database for storing updates or modifications of the legally relevant software. Known as the Metrology Audit Log, the database will record data relating to the date and time of the modification, what item was changed and the identity of the person who made the modification. Preferably the database is stored in a flash memory on the load cell.

Preferably, the secured communication via the legally relevant software between the processing unit and the weigh cell is by means of encrypted messages using a shared key embedded within each of the processing unit and the load cell. Optionally, the shared key means between the processing unit and the weigh cell is provided by means of a dongle as is commonly known in the art.

Preferably, the weighing apparatus comprises a GPS system interfaced with the processing unit and/or the load cell to compensate for changes in the gravitational constant in weight calculations. Preferably the interface between the GPS and the processing unit and/or the load cell is by secured communication means. More preferably, the secured communication means between the GPS system and the processing unit and/or the load cell is by means of encrypted messages using a shared key means.

Preferably, the portion of the data means or the legally relevant software in the load cell is fixed. Preferably, the load cell comprises tamper indication means so as to provide evidence of tampering with the legally relevant software. Preferably, the tamper indication means is a seal. Thus, if an unauthorised user attempts to access the data within the load cell, this will be made evident by the tamper indication means e.g. by means of a broken seal. Even, if the user did try to by-pass the tamper indication means, any modification or replacement of the data means in the load cell or in the processing unit, for instance, will prevent data in the processing unit communicating with data in the load cell which ultimately prevents operation of the weighing instrument.

To further add to the security of the portion of the data means, e.g. the legally relevant software, at least one portion of the data means, more particularly the portion of the data means distributed between processing unit and the load cell or the GPS device comprises a checksum algorithm whereby the checksum algorithm yields a checksum and compares it with a stored checksum. If there are any differences or the checksums do not match, then the data is considered to be tampered with.

DETAILED DESCRIPTION

Further features and aspects of the present invention will be apparent from the claims and the following description of an illustrative embodiment of a weighing apparatus made with reference to the accompanying drawing in which:—

FIG. 1 is a perspective view of the system architecture of a weighing apparatus according to an embodiment of the present invention.

The system architecture 1 of a weighing apparatus according to an embodiment of the present invention shown in FIG. 1, is divided into three distinct components 2, 3, 4 each having interface means 5, 6 for communication of data between each other. The first component 2 is a GPS device to compensate for variation of the gravitational constant at different locations as taught in US20020052703 (Tabet Nicholas N). The GPS device 2 is optional and is usually only required where the weighing apparatus is being used in a different location to where the initial gravity set up was made. Alternatively a fixed gravitational constant can be used where the weighing apparatus is used in one fixed location. The second component 3 which is external to the load cell is the processing unit or the main processing board of the weighing apparatus and represents the main processing hub of the weighing apparatus. The processing unit 3 carries out the main processing steps essential to the operation of the weighing apparatus and includes but not limited to the processing of data from the load cell and the GPS, calibration of the weighing apparatus, tare values, printing functions etc. The processing unit 3 can either be built into the weighing apparatus or alternatively, a personal computer external to the weighing apparatus. Due to the processing function of the second component 3, it holds data that are subject to both legal control (legally relevant software) 7 and non-legal control (non legally relevant software) 8. The third component 4 shown in FIG. 1 represents the load cell or weigh cell whereby a force applied to the load cell by an item is used to calculate the weight of the item. Typically, the load cell 4 is of the strain-gauge type whereby deformation of the strain gauge as a result of the force exerted by the weight of the item generates electrical signals which are then used to determine the weight of the item. Alternatively, the load cell 4 could be of the piezo-electric type which generates electrical signals proportional to the force exerted upon it.

Traditionally data that is subject to legal control otherwise termed legally relevant software is processed in a processing unit 3 external to the load cell 4. In some cases, the processing unit 3 take the form of a personal computer which is readily accessible to the user and therefore open to modification leading to fraudulent activity. According to the present invention, the legally relevant software is distributed or shared between the processing unit 3 and the load cell 4 having interface means 6 with secured communication operative between the processing unit 3 and the load cell 4. By having the load cell 4 take up some of the processing of the legally relevant software removes the reliance on the processing unit 3 to process the complete legally relevant software, thereby increasing security of the data in the legally relevant software against fraudulent activity. As a result of such a configuration of the components (processing unit 3 and load cell 4) some of the processing of the legally relevant software such as analogue-to-digital conversion may be carried out on the load cell 4 itself. Due to the accessibility of the processing unit 4 to the user, data that is subject to the highest level of protection may be stored on the load cell 4. Storing data on the load cell may be by means of a carrier built into the load cell 4. Data stored on the load cell 4 include but are not limited to:— a) calibration data 11;
b) capacity configuration 12 (e.g. weighing unit, maximum workable range, resolution);
c) gravity factor;
d) load cell software (e.g. load cell driver software);
e) an audit log 13 for changes made to the data in the load cell.

The portion of the legally relevant software 9, 10 stored on the load cell 4 is fixed and cannot be easily altered or modified by unauthorised people. Any modification of the legally relevant software in the load cell by authorised and/or certified personal may be recorded in a database or Metrology Audit Log 13. Such Metrology Audit Log 13 may exist in a flash memory in the load cell. Whenever anything which is relevant to the legal operation of the weighing instrument is changed, an entry will be made by the legally relevant software in the Metrology Audit Log. Each Metrology Audit Log entry will record the date, time, what item was changed and to what extent if it is known, as well as the identity of the person who changed it. Typically, the system may comprise a database of certified or authorised users each with a unique password or access code recognised by the system for accessing areas of the weighing instrument that is subject to legal control. In the case of configuration items, both the previous and new settings will be recorded, and likewise, in the case of software updates, both the previous and new software versions are recorded.

In use, the portion of the legally relevant software in the load cell interfaces with the load cell and the portion of the legally relevant software in the processing unit to provide the following functions:— a. accept data updates from the processing unit;
b. accept calibration data,
c. accept configuration;
d. accept audit log entries from the processing unit;
e. accept gravity factor data;
f. arranged to provide weight reading to the processing unit;
g. arranged to provide configuration data to the processing unit;
h. arranged to provide audit log entries to the processing.

All communication 6 operative between the processing unit 3 and the load cell 4 occurs via the legally relevant software on the processing unit is by secured means such as with encrypted messages using a shared key embedded 14, 15 within each component 3, 4. Consequently, if the portion of the legally relevant software 7 in the processing unit 3 were to be replaced with an application created by some other developer, it would be unable to communicate with the load cell 4, and thus would not act as a weighing instrument. Similarly, if the portion of the legally relevant software 9, 10 in the load cell 4 were to be replaced with an application created by some other developer, it would unable to communicate with the processing unit 3, and thus would not act as a weighing instrument. To successfully develop a new legally relevant software would require knowledge of the protocol, the encryption method and the keys, all of which are not published. The shared key means 14, 15 can be provided by means of a dongle (not shown) as is commonly known in the art. The dongle may be portable such as a USB pen. In addition to the shared key means the legally relevant software in either or both of the processing unit and the load cell can be provided with a checksum algorithm 16, 17, whereby a checksum is computed from data in the legally relevant software and compared with a stored checksum. If the checksums do not match, the data is considered to have been altered or modified.

The same level of secure communication between the processing unit and load cell can also exist between the GPS device 2 and the processing unit 3, i.e. the use of encrypted messages using shared key means 18 and a checksum algorithm to check whether the data particularly data relating to the gravitational constant has been tampered with.

The load cell 4 may additionally have tamper indication means (not shown) such as a physical seal to provide additional security to the portion of the legally relevant software accompanying the load cell. Any attempt to tamper with the legally relevant software in the load cell will be made evident by, for example, a broken seal.

In addition, the weighing apparatus can be set up so that the following:— a) calibration data 11;
b) capacity configuration 12;
c) gravity factor;
d) load cell software;

can be changed in the load cell only if the physical seal is broken and a service switch is depressed. Where a GPS device 2 is used for compensating changes in the gravitational constant or gravity factor as discussed above having secured communication 5 operative between the GPS device 2 and the processing unit 3 then the gravitational constant can be automatically compensated to reflect its location without the need to tamper with the tamper indication means. However, to manually change the gravity factor in the load cell component may require breaking the seal.

On the other hand, data that are not subject to legal control 8 (otherwise termed non-legal relevant software) include but not limited to the following:— a) Operating system such as Linux kernel
b) the root file system (graphics library, USB library, WebBrowser, fonts etc)
c) the scale application software responsible for the graphical user interface, database and communication and input from the user.

Communication 20 between the legally relevant software 7 and the non-legally relevant software 8 in the processing unit need not necessarily be by secured means. This includes applications relating to the presentation or the front face of the display unit, e.g. the use of marketing icons such as trademarks or brands or graphics, user interface etc .

Finally, the weighing apparatus 1 further comprises a display and/or printer 19 for presenting information to the user such as pricing information and weight etc.

The illustrative architecture of the weighing apparatus described above is not restricted to three distinct components and can include further components or peripherals such as a printer etc. However, in either case, data that is subject to legal control is distributed or shared between the processing unit and the load cell with secured communication operative between the load cell and the processing unit. Moreover, the choice of the data in the legally relevant software that is distributed between the load cell and the processing unit is not limited to the specific embodiment described above and other selections are permissible.

The invention claimed is:

1. A weighing apparatus subject to legal control comprising:
    a load cell configured to indicate tampering therewith; and
    a processing unit external of the load cell outside an area of the weighing apparatus subject to the indication of tampering with the load cell; wherein the weighting apparatus includes legally relevant software and non-legally relevant software, a portion of the legally relevant software is stored in the load cell, wherein the weighting apparatus is configured for secured two-way communication operative between the load cell and the processing unit;
    characterized in that said portion of the legally relevant software in the load cell comprises a metrology audit log for recording changes made to the legally relevant software,
    wherein the metrology audit log is a database of recorded data relating to a modification of the legally relevant software, and
    wherein the weighing apparatus is configured such that any modification or replacement of the portion of the legally relevant software stored in the load cell prevents operation of the weighting apparatus, and
    wherein the load cell is configured to interface with the processing unit to provide for all of the following:
    a. acceptance of data updates from the processing unit;
    b. acceptance of calibration data,
    c. acceptance of capacity configuration data;
    d. weight readings to be provided to the processing unit;
    e. configuration data to be provided to the processing unit; and
    f. audit log entries to be provided to the processing unit.

2. A weighing apparatus as claimed in claim 1, wherein the portion of the data means distributed between the processing unit and the load cell is the legally relevant software.

3. A weighing apparatus as claimed in claim 1, wherein the legally relevant software comprises at least one of type-specific parameter and/or device-specific parameter.

4. A weighing apparatus as claimed in Claim 1, wherein at least one portion of the data means comprise a checksum.

5. A weighing apparatus as claimed in claim 1, wherein the load cell further comprises processing means.

6. A weighing apparatus as claimed in claim 5, wherein the processing means is an analogue-to-digital convertor.

7. A weighing apparatus as claimed in claim 1, wherein the load cell is configured to interface with the processing unit to provide for acceptance of gravity factor data.

8. A weighing apparatus as claimed in claim 1, wherein the weighing apparatus comprises a GPS device interfaced with the processing unit and/or the load cell.

9. A weighing apparatus as claimed in claim 1, wherein the portion of data means in the load cell is fixed.

10. A weighing apparatus as claimed in claim 1, wherein the load cell comprises tamper indication means so as to provide evidence of tampering of the data means.

11. A weighing apparatus as claimed in claim 1, wherein the apparatus further comprises a database for storing updates or modifications of the legally relevant software.

12. A weighing apparatus as claimed in claim 11, wherein the database is stored in a flash memory in the load cell.

13. The weighing apparatus of claim 1, wherein:
    the weighing apparatus is configured such that whenever anything relevant to the legal operation of the weighing apparatus is changed, an entry is made by the legally relevant software in the metrology audit log.

14. The weighing apparatus of claim 13, wherein:
    the tampering with the at least a portion of the portion of the legally relevant software distributed in the processing unit is replacement of the at least a portion of the portion of the legally relevant software distributed in the processing unit.

15. The weighing apparatus of claim 1, wherein:
    the metrology audit log is a database of recorded data relating to at least one of a date of the modification of the legally relevant software, a time of the modification of the legally relevant software, an item of the legally relevant software that was changed in the modification thereof, or the identity of the person who made the modification of the legally relevant software.

16. The weighing apparatus of claim 1, wherein:
    the metrology audit log is a database of recorded data relating to at least one of a date of the modification of the legally relevant software, a time of the modification of the legally relevant software, an item of the legally relevant software that was changed in the modification thereof, or the identity of the person who made the modification of the legally relevant software.

17. The weighing apparatus of claim 1, wherein:
    the metrology audit log is a database of recorded data relating to a date of the modification of the legally relevant software, a time of the modification of the legally relevant software, an item of the legally relevant software that was changed in the modification thereof, and the identity of the person who made the modification of the legally relevant software.

18. The weighing apparatus of claim 1, wherein:
    the weighing apparatus is configured such that at least a portion of the portion of the legally relevant software distributed in the processing unit is accessible to a user and the weighing apparatus is configured such that tampering with the at least a portion of the portion of the legally relevant software distributed in the processing unit prevents communication between the portion of the legally relevant software distributed in the load cell and the portion of the legally relevant software distributed in the processing unit, which communication was present before the tampering.

19. The weighing apparatus of claim 1, wherein:
    the weighing apparatus is configured such that a portion of the legally relevant software is processed in the load cell and a portion of the legally relevant software is processed in the processing unit.

20. The weighing apparatus of claim 1, wherein:
    the weighing apparatus is configured such that communication between the portion of the legally relevant software distributed in the load cell and the portion of the legally relevant software distributed in the processing unit is prevented upon an attempt to tamper with the legally relevant software.

21. The weighing apparatus of claim 1, wherein:
the weighing apparatus is configured such that normal operation of the weighing apparatus is prevented upon tampering with the legally relevant software.

22. The weighing apparatus of claim 1, wherein:
the weighing apparatus is configured such that a portion of the legally relevant software is distributed in the load cell and a portion of the legally relevant software is distributed in the processing unit.

23. The weighing apparatus of claim 1, wherein:
the metrology audit log is a database of recorded data relating to at least two of the date of the modification of the legally relevant software, the time of the modification of the legally relevant software, the item of the legally relevant software that was changed in the modification thereof, and the identity of the person who made the modification of the legally relevant software.

24. A weighing apparatus comprising:
a load cell configured to indicate tampering therewith and including a memory; and
a processing unit external of the load cell outside an area of the weighing apparatus subject to the indication of tampering with the load cell; wherein the weighting apparatus includes legally relevant software and non-legally relevant software, a portion of the legally relevant software is stored in the memory of the load cell and processed in the load cell, wherein the weighting apparatus is configured for secured two-way communication operative between the load cell and the processing unit; characterized in that said portion of the legally relevant software in the load cell comprises a metrology audit log for recording changes made to the legally relevant software,
wherein the weighing apparatus is configured such that any modification or replacement of the portion of the legally relevant software stored in the load cell prevents operation of the weighting apparatus; and
wherein the load cell is configured to interface with the processing unit to provide for all of the following:
a. acceptance of data updates from the processing unit;
b. acceptance of calibration data,
c. acceptance of capacity configuration data;
d. weight readings to be provided to the processing unit;
e. configuration data to be provided to the processing unit; and
f. audit log entries to be provided to the processing unit.

25. The weighing apparatus of claim 24, wherein:
the metrology audit log is a database of recorded data relating to the date of the modification of the legally relevant software, the time of the modification of the legally relevant software, the item of the legally relevant software that was changed in the modification thereof, and the identity of the person who made the modification of the legally relevant software.

26. The weighing apparatus of claim 24, wherein:
the metrology audit log is a database of recorded data relating to at least one of a date of the modification of the legally relevant software, a time of the modification of the legally relevant software, an item of the legally relevant software that was changed in the modification thereof, or the identity of the person who made the modification of the legally relevant software.

27. The weighing apparatus of claim 26, wherein:
the metrology audit log is a database of recorded data relating to at least two of the date of the modification of the legally relevant software, the time of the modification of the legally relevant software, the item of the legally relevant software that was changed in the modification thereof, and the identity of the person who made the modification of the legally relevant software.

28. A weighing apparatus as claimed in claim 24, wherein the load cell is configured to interface with the processing unit to provide for acceptance of gravity factor data.

29. A weighing apparatus subject to legal control comprising:
a) a load cell; and
b) a processing unit external of the load cell and separate from the load cell, wherein
a first portion of legally relevant software is stored in the load cell, wherein the weighing apparatus is configured such that secured two-way communication is operative between the load cell and the processing unit,
said first portion of the legally relevant software in the load cell comprises a metrology audit log for recording changes made to the legally relevant software,
the load cell is configured to provide evidence of tampering with and/or accessing of the first portion of legally relevant software stored therein, and
the weighting apparatus is configured to prevent communication of a second portion of legally relevant software distributed in the processing unit with the first portion of the legally relevant software in the event of tampering with the first portion of legally relevant software, and
wherein the load cell is configured to interface with the processing unit to provide for all of the following:
a. acceptance of data updates from the processing unit;
b. acceptance of calibration data,
c. acceptance of capacity configuration data;
d. weight readings to be provided to the processing unit;
e. configuration data to be provided to the processing unit; and
f. audit log entries to be provided to the processing unit.

30. The weighing apparatus of claim 29, wherein:
the weighing apparatus further includes non-legally relevant software and a second portion of legally relevant software.

31. The weighting apparatus of claim 29, wherein the second portion of the legally relevant software is stored and/or processed outside the load cell.

32. The weighing apparatus of claim 31, wherein the metrology audit log is a database of recorded data relating to a modification of the legally relevant software.

33. A weighing apparatus as claimed in claim 29, wherein the load cell is configured to interface with the processing unit to provide for acceptance of gravity factor data.

* * * * *